3,091,590
HYDRAULIC FLUID COMPOSITION

Neal W. Furby and Charles D. Newnan, Berkeley, Calif., assignors to California Research Corporation, San Francisco, Calif., a corporation of Delaware
No Drawing. Original application Aug. 28, 1953, Ser. No. 377,240. Divided and this application May 20, 1957, Ser. No. 660,054
1 Claim. (Cl. 252—78)

The present invention relates to the preparation of novel compositions useful as hydraulic fluids. More particularly, the invention has to do with the preparation of such compositions based on certain organo-silicon compounds as essential ingredients. This application is a division of application Serial No. 377,240, filed August 28, 1953, which in turn is a continuation-in-part of application Serial No. 215,638, filed March 14, 1951.

In general, a suitable hydraulic fluid is required to have certain properties, such as good wear characteristics in the lubrication of moving parts of hydraulic systems; oxidation-corrosion stability; good volatility characteristics; compatibility with the seals employed in the hydraulic system; resistance to fire; good shear characteristics, that is, retention of body and viscosity when subjected to the shearing action of hydraulic pumps and when passing through small openings or orifices at high pressure; and most importantly, a good viscosity-temperature relationship, that is, small change in viscosity over a wide temperature range, such as is encountered, for example, in the operation of aircraft. Other additional requirements of a suitable hydraulic fluid are ease of handling, non-toxicity, etc.

The fluids heretofore proposed as hydraulic fluids, while possessing one or more of the aforesaid desired properties, are lacking in one or more other properties or do not possess the desired properties to an extent regarded as satisfactory. Hydraulic fluids based on mineral oils, for example, have heretofore been extensively used. Such fluids have certain desirable characteristics, for example, good lubricating properties, but are deficient in other respects, for example, generally inferior viscosity-temperature characteristics, etc.

We have discovered that hydraulic fluids based on a blend of alkyl silicone and alkyl silicate possess all the desirable attributes enumerated above, and have excellent temperature-viscosity characteristics. Moreover, the fluids prepared in accordance with the invention admit the incorporation of additives which impart to the final fluid additional desirable properties or improve those already possessed by the blend. Compositions heretofore proposed as hydraulic fluids are generally not only inferior from a viscosity-temperature standpoint, but those that may have a satisfactory viscosity-temperature relationship are deficient in that they do not permit the incorporation of agents to improve one or more of the properties of the fluid. In addition, we have found that our fluids have superior volatility characteristics; that is, as compared with other fluids of like viscosity, our fluids are less volatile, as a result of which evaporation losses are reduced, as is the formation of heavy residues which adversely affect viscosity, lubricity, etc.

In brief, the fluid compositions of the present invention are made up of a total of from about 85 to 97% by weight of tetra-alkyl silicate, together with from about 3 to 15% by weight of dialkyl silicone polymer.

The alkyl silicate component of the blend can be described as one having the general formula

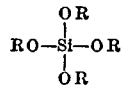

where the R's, which may be the same as or different from one another, represent alkyl groups of from 1 to about 18 carbon atoms each. Preferably, however, each of the R's represents a branched-chain alkyl group of from 5 to 8 carbon atoms, the branched radicals herein referred to being those derived from secondary or tertiary alcohols, or from primary alcohols wherein branching occurs in the 2- position. Specific examples of tetraalkyl silicate esters contemplated by the invention are tetraethyl silicate, tetra(2-butyl) silicate, tetra(n-octyl) silicate, as well as those silicates having the preferred structure indicated above, such as tetra(2-methyl-1-butyl) silicate, tetra(2-methyl-2-butyl) silicate, tetra(n-hexyl) silicate, tetra(2-hexyl) silicate, tetra(2-ethyl-1-butyl) silicate, tetra(2-heptyl) silicate, tetra(2-octyl) silicate, and tetra(2-ethyl-1-hexyl) silicate.

The alkyl silicone polymer component of the blend of the present invention can be represented by the general formula,

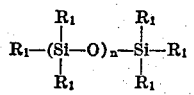

where $n$ is an integer having a value of at least one and wherein the $R_1$'s are lower alkyl radicals of from 1 to 5 carbon atoms each. Said silicone polymer is one which has a viscosity of at least 1,000 cs., as measured at 77° F., and which may have a viscosity as high as 10,000,000 or more cs. at 77° F. Preferably, the silicone component of the present blend is one having a viscosity between about 60,000 and 2,500,000 cs. at 77° F. Said silicone polymers may be of either branched or straight-chain configuration, and they may also incorporate various cross-linkages, all as is clearly understood in the silicone art, always provided that the silicone polymer be one which is soluble in the alkyl silicate component of the blend to the extent of at least 3% by weight. Representative silicone polymers are dimethyl silicone, diethyl silicone, methylethyl silicone, dipropyl silicone, dibutyl silicone and diamyl silicone.

The following examples illustrate compositions prepared in accordance with the invention.

Example 1

About 12 parts of dimethyl silicone having a viscosity of about 2,500,000 centistokes at 77° F. was mixed with about 88 parts of tetra(2-ethyl-1-butyl) silicate, the parts being by weight. The resulting blend had the following viscosities:

| Temperature, ° F.: | Centistokes |
|---|---|
| —65 | 6,097 |
| 100 | 198.1 |
| 130 | 147.6 |
| 210 | 81.9 |
| 400 | 30.5 |

In addition, the ASTM slope of the foregoing blend determined between 100° F.–210° F. was 0.20. As is well known in the art, the ASTM slope is an indication of the rate of change of viscosity with temperature, the smaller the change the better the composition. The figure 0.20 was obtained by plotting viscosity against temperature on an ASTM D-341 viscosity-temperature chart and determining the slope. In general, hydraulic fluids having stringent requirements, such as for aircraft will have an ASTM slope below about 0.55.

Example 2

To about 91 parts of tetra(2-ethyl-1-hexy) silicate there was added about 9 parts of diethyl silicone having a viscosity of about 200,000 cs. at 100° F., the parts being by weight. The resulting composition had an ASTM slope of 0.42 and the following viscosities:

| Temperature, °F.: | Centistokes |
|---|---|
| −65 | 5,535 |
| 100 | 31.8 |
| 130 | 21.6 |
| 210 | 9.94 |

*Example 3*

A hydraulic fluid composition suitable for use in aircraft was made up of about 89 parts of tetra(2-ethyl-1-butyl) silicate, 10 parts of dimethyl silicone having a viscosity of about 100,000 centistokes at 77° F., and about 1 part of phenyl-α-naphthylamine, the parts being by weight. The final composition had an ASTM slope of 0.31 and the following viscosities:

| Temperature, °F.: | Centistokes |
|---|---|
| −65 | 1,151 |
| −40 | 402 |
| 100 | 29.5 |
| 210 | 12.2 |
| 400 | 4.83 |

Ordinarily, it is required that a hydraulic fluid suitable for aircraft use have a minimum viscosity of 10 centistrokes at 130° F., and a maximum viscosity of 500 centistokes at −40° F. The foregoing composition meets all specifications for a satisfactory aircraft hydraulic fluid.

*Example 4*

A composition was made up of 8 parts of methylethyl silicone having a viscosity of 136,000 cs. at 77° F., together with 92 parts of a mixture made up of tetra(2-ethylbutyl) silicate (75%) and tetra (2-ethylhexyl) silicate (25%). The resulting composition had an ASTM slope of 0.436 and had the following viscosities:

| Temperature, °F.: | Centistokes |
|---|---|
| −65 | 1,726 |
| 100 | 24.8 |
| 210 | 9.16 |

Although the compositions described in the foregoing examples possess those properties, such as anti-wear, viscosity, viscosity index, lubricity, thermal and oxidative stability, etc., to a degree satisfactory to render them useful as hydraulic fluids meeting the most stringent requirements, it will be obvious to those skilled in the art that additives, such as anti-wear and anti-rust agents, oxidation and corrosion inhibitors, etc., may be incorporated in the blends to improve one or more properties thereof. Similarly, it will occur to those skilled in the art that the properties of the herein-described compositions are such as to render them useful in applications other than as power transmission fluids. For example, the fluids contemplated by the invention may be used as lubricants for special purposes, such as in the lubrication of machine guns, aircraft instruments, etc.

We claim:

A power transmission fluid consisting essentially of 85 to 97% by weight of tetra-octyl orthosilicate and 3 to 15% by weight of dimethyl silicone polymer having a viscosity above 60,000 centistokes at 25° C.

References Cited in the file of this patent
UNITED STATES PATENTS

| 2,495,363 | Barry et al. | Jan. 24, 1950 |
| 2,681,313 | Kather et al. | June 15, 1954 |
| 2,684,336 | Moreton | July 20, 1954 |
| 2,746,926 | Barry | May 22, 1956 |